(12) United States Patent
Lim

(10) Patent No.: US 12,053,111 B2
(45) Date of Patent: Aug. 6, 2024

(54) SLEEPING BAG WITH IMPROVED HEAT-RETAINING PROPERTY

(71) Applicant: Nineby Co., Ltd., Incheon (KR)

(72) Inventor: Kyung Sup Lim, Incheon (KR)

(73) Assignee: Nineby Co., Ltd., Incheon (KR)

( * ) Notice: Subject to any disclaimer, the term of this patent is extended or adjusted under 35 U.S.C. 154(b) by 565 days.

(21) Appl. No.: 16/961,971

(22) PCT Filed: Mar. 10, 2020

(86) PCT No.: PCT/KR2020/003334
§ 371 (c)(1),
(2) Date: Jul. 14, 2020

(87) PCT Pub. No.: WO2020/184957
PCT Pub. Date: Sep. 17, 2020

(65) Prior Publication Data
US 2021/0378426 A1 Dec. 9, 2021

(30) Foreign Application Priority Data
Mar. 11, 2019 (KR) .................. 10-2019-0027448

(51) Int. Cl.
*A47G 9/08* (2006.01)
*A47G 9/02* (2006.01)
(Continued)

(52) U.S. Cl.
CPC ........... *A47G 9/086* (2013.01); *A47G 9/0215* (2013.01); *A47G 9/0261* (2013.01); *B32B 5/26* (2013.01);
(Continued)

(58) Field of Classification Search
CPC ................. A47G 9/086; B32B 15/14
See application file for complete search history.

(56) References Cited

U.S. PATENT DOCUMENTS 6,177,369 B1 * 1/2001 Kwok ............... D04H 1/54
442/364
6,802,081 B1 * 10/2004 Ogino ............... D04H 1/04
2/164
(Continued)

FOREIGN PATENT DOCUMENTS

JP S5625571 3/1981
JP 3004274 U 11/1994
(Continued)

OTHER PUBLICATIONS

Office Action from corresponding Korean Patent Application No. 10-2019-0027448, dated May 7, 2019.
(Continued)

*Primary Examiner* — Alexander S Thomas
(74) *Attorney, Agent, or Firm* — Harness, Dickey & Pierce, P.L.C.

(57) ABSTRACT

Provided is a sleeping bag including a warmth-improving portion. The warmth-improving portion includes a first insulation layer located on one surface in an inward direction of a sleeping bag outer covering and configured to block an inflow of the cold from the outside, a first compressed fiber layer located on one surface of the first insulation layer, and a heat-retention layer located on one surface of the first compressed fiber layer. According to the present invention, since it is possible to block the cold from the outside and to prevent warmth inside from being released using a first insulation layer, heat-retaining performance may be maximized. Since heat is generated on the basis of steam outside and inside a sleeping bag using a heat-retention layer, it is possible to easily increase and maintain a temperature inside the sleeping bag without a separate heat source.

5 Claims, 12 Drawing Sheets

(51) Int. Cl.
    *B32B 5/26*     (2006.01)
    *B32B 15/14*     (2006.01)
    *B32B 15/20*     (2006.01)
    *C09K 5/16*     (2006.01)
    *B32B 17/10*     (2006.01)

(52) U.S. Cl.
    CPC .............. *B32B 15/14* (2013.01); *B32B 15/20* (2013.01); *C09K 5/16* (2013.01); *B32B 17/10743* (2013.01); *B32B 2262/0276* (2013.01); *B32B 2307/304* (2013.01)

(56) References Cited

U.S. PATENT DOCUMENTS

| | | | |
|---|---|---|---|
| 2002/0019654 A1* | 2/2002 | Ellis | A61F 7/007 607/98 |
| 2010/0024126 A1* | 2/2010 | SiKui | A47G 9/086 5/413 R |
| 2014/0227552 A1* | 8/2014 | Lau | B32B 5/02 428/221 |

FOREIGN PATENT DOCUMENTS

| | | |
|---|---|---|
| JP | H09182653 A | 7/1997 |
| JP | 2001046204 A | 2/2001 |
| JP | 2006314674 A | 11/2006 |
| JP | 5866618 B2 | 2/2016 |
| KR | 20-0373006 Y1 | 1/2005 |
| KR | 20-0419836 Y1 | 6/2006 |
| KR | 10-0743266 B1 | 8/2007 |
| KR | 20-0436666 Y1 | 9/2007 |
| KR | 10-0983790 B1 | 9/2010 |
| KR | 10-1351940 B1 | 1/2014 |
| KR | 20-0486066 Y1 | 3/2018 |
| KR | 20-0487571 Y1 | 10/2018 |

OTHER PUBLICATIONS

Office Action from corresponding Korean Patent Application No. 10-2019-0027448, dated Aug. 20, 2019.
Office Action from corresponding Japanese Patent Application No. 2020-540335, dated Jul. 16, 2021.

* cited by examiner

SLEEPING BAG WITH IMPROVED HEAT-RETAINING PROPERTY

CROSS-REFERENCE TO RELATED APPLICATIONS

This application is a national phase application of PCT Application No. PCT/KR2020/003334, filed on 10 Mar. 2020, which claims priority to Korean Patent Application No. 10-2019-0027448, filed on 11 Mar. 2019. The entire disclosure of the applications identified in this paragraph are incorporated herein by references.

FIELD

The present invention relates to a sleeping bag. In more detail, the present invention relates to a sleeping bag allowing a temperature inside the sleeping bag to be easily increased by blocking cold air which flows into the sleeping bag and preventing warmth inside the sleeping bag from being released as well as allowing a heat generation effect to be increased with respect to steam generated inside and outside the sleeping bag.

BACKGROUND

Generally, sleeping bags are items used for sleeping outside. In detail, sleeping bags have a shape with an opening to allow a user's body to enter. Accordingly, since it is possible to relieve fatigue of a user during a recreation activity for which rest is required and sleep outdoors for a long time for fishing, camping, or the like, sleeping bags have been frequently used in a variety of outdoor activities and military activities. Also, since an air layer is formed inside the sleeping bag due to a sleeping bag including a filler for maintaining a body temperature of a user for a long time, the sleeping bag may be insulated so as to continuously maintain a temperature. A sleeping bag including an outer covering layer, an inner covering layer, and a heat-retention layer is disclosed in Cited Document 1 (Korean Patent Registration No. 10-0983790).

However, in the case of Cited Document 1, since a bottom part of the sleeping bag which comes into contact with the ground is pressed by a weight of a user such that the air layer is not formed thereat, it is difficult to block cold air from the ground from entering an inside of the sleeping bag so that heat-retaining and insulation effects are decreased. Accordingly, a sleeping bag capable of maximizing heat-retaining and insulation effects is necessary.

RELATED ART DOCUMENTS

Patent Documents

Cited Document 1: Korean Patent Registration No. 10-0983790 (registered on Sep. 16, 2010)
Cited Document 2: Korean Utility Model Registration No. 20-0486066 (registered on Mar. 23, 2018)
Cited Document 3: Korean Utility Model Registration No. 20-0487571 (registered on Oct. 1, 2018)

SUMMARY

Technical Problem

The present invention is directed to providing a sleeping bag capable of maximizing heat-retaining and insulation effects by blocking the cold which flows from the outside of the sleeping bag and preventing warmth inside the sleeping bag from being released.

The present invention is also directed to providing a sleeping bag capable of providing comfort for a user by increasing a temperature inside the sleeping bag using steam generated inside and outside the sleeping bag instead of decreasing the temperature.

The present invention is also directed to providing a sleeping bag configured to increase a heat-retaining effect with respect to body parts such as hands, feet, and the like which are sensitive to a temperature change.

Technical Solution

One aspect of the present invention provides a sleeping bag including a warmth-improving portion. The warmth-improving portion includes a first insulation layer located on one surface in an inward direction of a sleeping bag outer covering and configured to block an inflow of the cold from the outside, a first compressed fiber layer located on one surface of the first insulation layer, and a heat-retention layer located on one surface of the first compressed fiber layer.

Advantageous Effects

According to the present invention, since it is possible to block the cold from the outside and to prevent warmth inside from being released using a first insulation layer, heat-retaining performance may be maximized.

Also, according to the present invention, since heat is generated on the basis of steam outside and inside a sleeping bag using a heat-retention layer, it is possible to easily increase and maintain a temperature inside the sleeping bag without a separate heat source.

Also, according to the present invention, heat-retaining efficiency may be significantly increased by interfering in convection of the cold outside the sleeping bag in an inward direction using a first compressed fiber layer.

BEST MODE OF THE INVENTION

Figure 1:
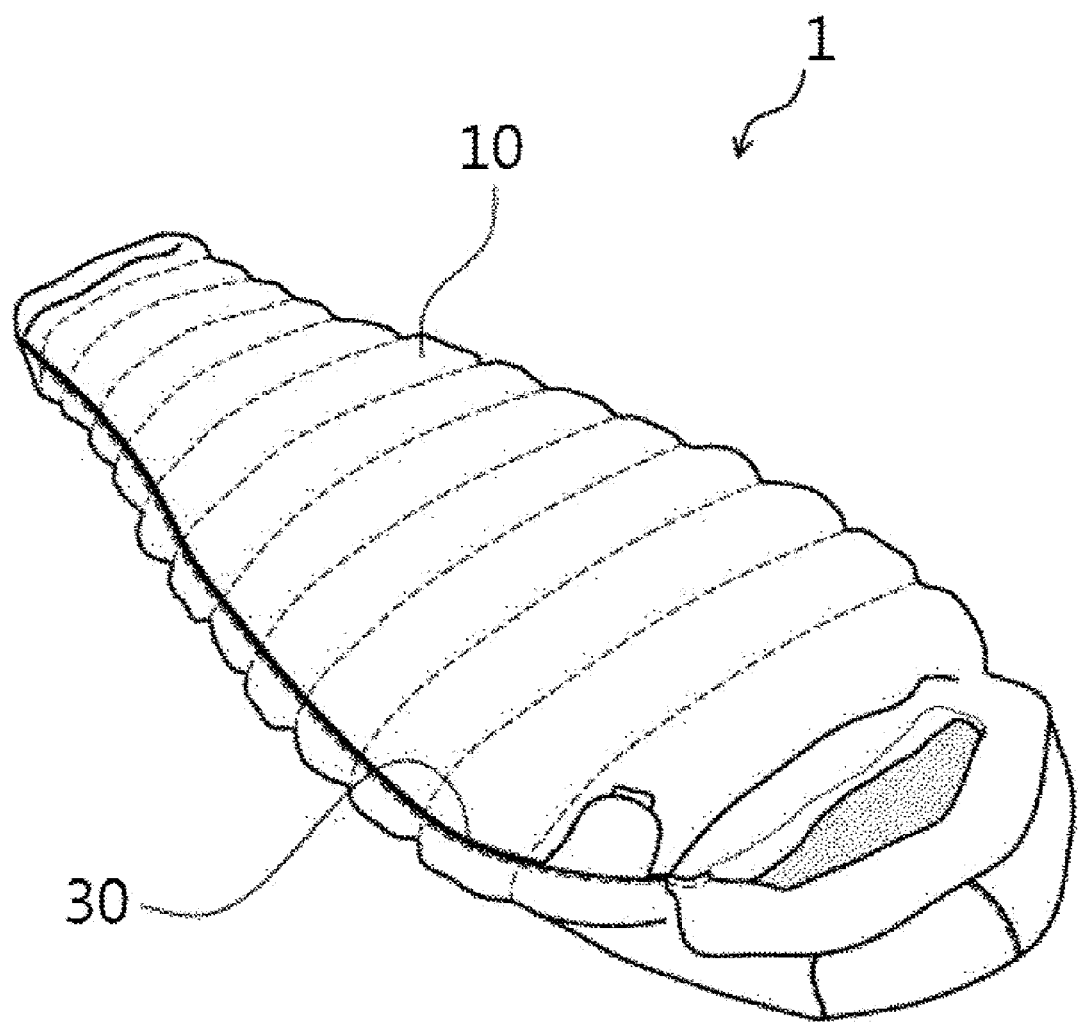
FIG. 1 is a perspective view of a sleeping bag according to one embodiment of the present invention.

A sleeping bag includes a warmth-improving portion 100. The warmth-improving portion 100 includes a first insulation layer 110 inwardly located on one surface of a sleeping bag outer covering 10 and configured to block an inflow of the cold, a first compressed fiber layer 120 located on one surface of the first insulation layer 110, and a heat-retention layer 130 located on one surface of the first compressed fiber layer 120. The warmth-improving portion 100 further includes a second compressed fiber layer 140 having a polyester fiber material formed on one surface of the heat-retention layer 130 and a second insulation layer 150 having an aluminum film material located on one surface of the second compressed fiber layer 140. Here, the first insulation layer 110 is an aluminum film. An inflow of the cold outside the sleeping bag is blocked by the first insulation layer 110. Warmth inside the sleeping bag is prevented, by the second insulation layer 150, from being released outward. A convection current of the air inside the sleeping bag is prevented by the first compressed fiber layer 120 and the second compressed fiber layer 140. The warmth-improving portion 100 is formed at a back part to which a weight of a user is applied toward the ground and a side part so as to prevent heat-retaining and insulating effects from being decreased by the weight.

DETAILED DESCRIPTION

Hereinafter, embodiments of the present invention will be described in detail to be implemented by one of ordinary skill in the art with reference to the attached drawings. However, the present invention may be implemented to have a variety of different forms and is not limited to the following embodiments. Also, throughout the drawings, to clearly describe the present invention, parts irrelevant to the present invention are omitted, and like or similar reference numerals refer to like or similar components.

The aspects and effects of the present invention may be naturally understood or be more apparent and are not limited to only the following disclosure.

The aspects, features, and advantages of the present invention will be more apparent from the following detailed description. Also, in describing the present invention, when it is determined that a detailed description of known techniques associated with the present invention would unnecessarily obscure the subject matter of the present invention, the detailed description thereof will be omitted.

Hereinafter, an embodiment of the present invention will be described in detail with reference to the attached drawings. Before describing the present invention in detail, "outward direction (outside)" is a direction from an internal space of a sleeping bag toward an outside of the sleeping bag and "inward direction (inside)" is a direction from the outside of the sleeping bag toward the internal space of the sleeping bag. That is, "outward direction (outside)" and "inward direction (inside)" are directions based on the internal space of the sleeping bag. Accordingly, "inward direction" means an upward direction in FIGS. 3 to 9, and "outward direction" means a downward direction in FIGS. 3 to 9. Also, throughout the present invention, the terms such as "first," "second," or the like are used to avoid confusion by distinguishing a plurality of components from each other and do not limit significances of corresponding components.

Figure 2:
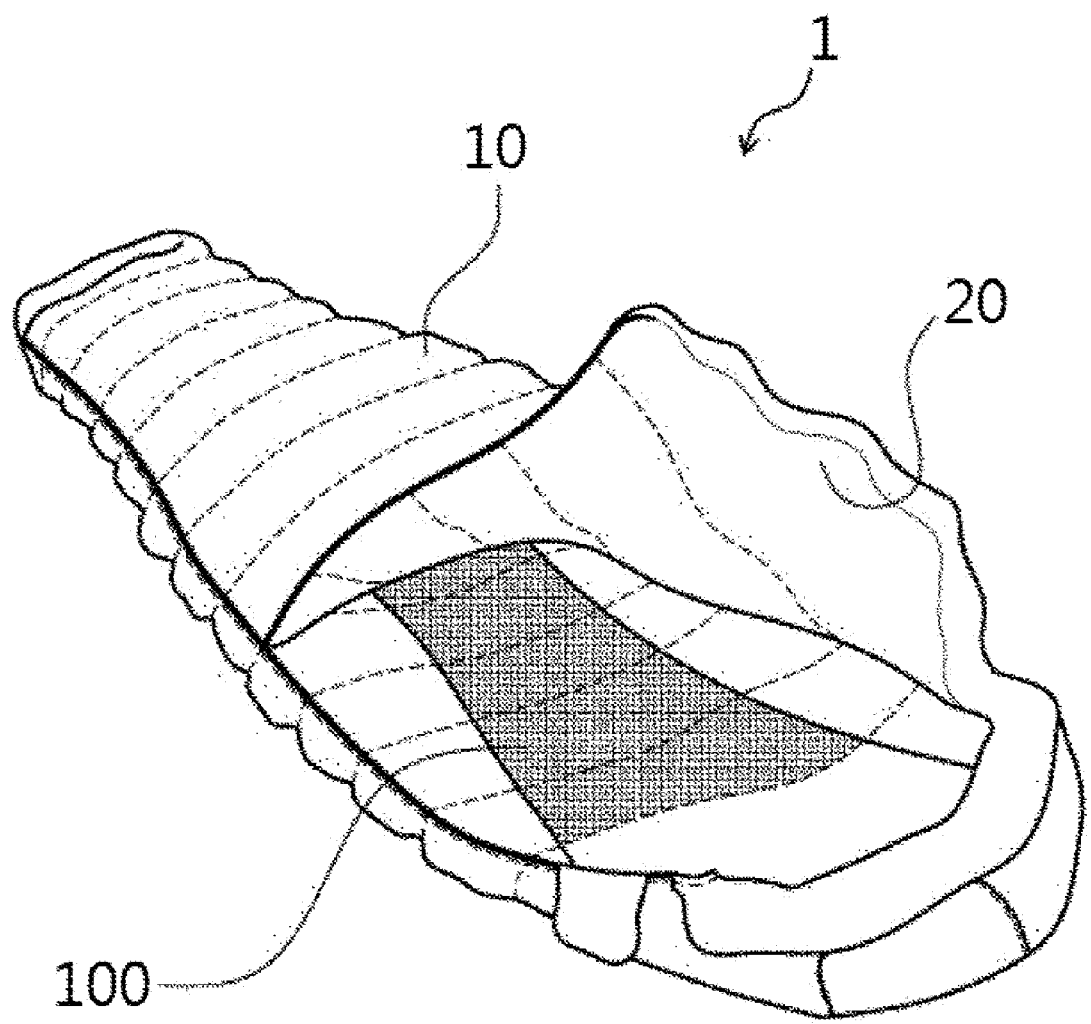
FIG. 2 is a perspective view illustrating a warmth-improving portion of the sleeping bag according to one embodiment of the present invention.

FIG. 1 is a perspective view of a sleeping bag according to one embodiment of the present invention, and FIG. 2 is a perspective view illustrating a warmth-improving portion 100 according to one embodiment of the present invention.

The sleeping bag according to one embodiment of the present invention includes a sleeping bag outer covering 10 and a sleeping bag inner covering 20. In detail, the sleeping bag outer covering 10 is a component located in an outermost direction of the sleeping bag and is a component configured to protect an internal space of the sleeping bag from an external force and the cold. Also, the sleeping bag inner covering 20 is formed inside the sleeping bag outer covering 10, is configured to come into contact with the internal space of the sleeping bag, distinguishes the internal space of the sleeping bag from the outside of the sleeping bag, and protects the internal space of the sleeping bag from an external force and the cold. The sleeping bag outer covering 10 and the sleeping bag inner covering 20 are configured to surround the internal space of the sleeping bag and are opened or closed by an opening or closing device 30 which is additionally provided. In detail, the opening or closing device 30 is formed along a perimeter (rim) of the sleeping bag and has a variety of shapes including a zipper, Velcro, and the like but is not limited thereto. Accordingly, a user may easily enter or exit from the sleeping bag using the opening or closing device 30.

The warmth-improving portion 100 is provided inside the sleeping bag outer covering 10. The warmth-improving portion 100 is a component configured to maximize heat-retaining and insulation properties by preventing an inflow of the cold outside the sleeping bag and preventing warmth inside the sleeping bag from being released outward. To this end, the warmth-improving portion 100 is inwardly located on one surface of the sleeping bag outer covering 10. As a more detailed embodiment, the warmth-improving portion 100 may be disposed on a backrest part of the sleeping bag which is pressed toward the ground by a body weight of a user. In detail, the warmth-improving portion 100 may be formed at positions corresponding to the neck, shoulders, back, waist, and the like of the user which are located inside the sleeping bag. However, the position of the warmth-improving portion 100 is not limited and may be provided to an overall part of the sleeping bag which comes into contact with the ground (which means a lower side part of the sleeping bag located on the ground). Also, the warmth-improving portion 100 may be provided at a side part of the user located inside the sleeping bag, that is, a side surface part of the sleeping bag so that the user who is located inside the sleeping bag while the side comes into contact with the ground may not feel cold so as to increase comfortableness.

Figure 3:
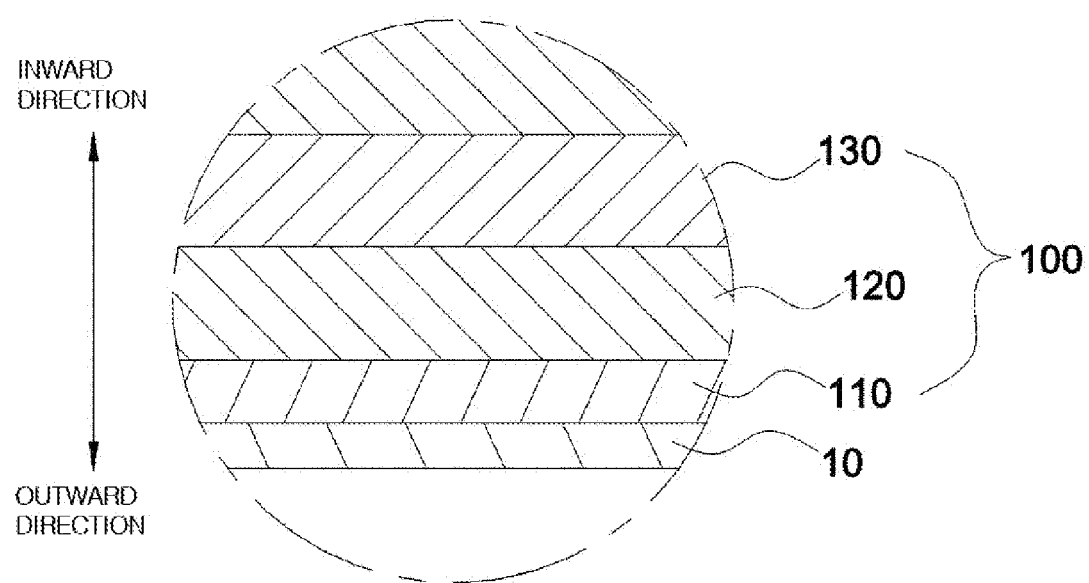
FIG. 3 is a cross-sectional view illustrating the warmth-improving portion according to one embodiment of the present invention.

FIG. 3 is a cross-sectional view illustrating the warmth-improving portion 100 according to one embodiment of the present invention.

As described above, the warmth-improving portion 100 is a component configured to improve an insulation property and a heat-retaining property by preventing an inflow of the cold outside the sleeping bag and preventing warmth inside the sleeping bag from being released outward. To this end, the warmth-improving portion 100 is provided on the part of the sleeping bag which comes into contact with the ground (which means the lower part of the sleeping bag which is disposed on the ground) and located inside the sleeping bag outer covering 10. Also, the warmth-improving portion 100 includes a first insulation layer 110, a first compressed fiber layer 120, and a heat-retention layer 130 to obtain the above effects. Since the warmth-improving portion 100 is provided so that the cold outside the sleeping bag does not move inward and warmth generated inside the sleeping bag is convected inside the sleeping bag, the insulation property and the heat-retaining property may be maximized. Hereinafter, the first insulation layer 110, the first compressed fiber layer 120, and the heat-retention layer 130 included in the warmth-improving portion 100 will be described in detail.

The first insulation layer 110 is a component configured to prevent cold permeation. In detail, the first insulation layer 110 is a component configured to insulate heat and performs a function of increasing heat-retaining performance by suppressing the cold outside the sleeping bag from being conducted inward. To this end, the first insulation layer 110 is provided on one surface which faces the inside of the sleeping bag outer covering 10. In detail, the first insulation layer 110 is formed of an aluminum film material and provided inside the sleeping bag outer covering 10. In more detail, the first insulation layer 110 provided as an aluminum film material performs a function of blocking movement of air. Accordingly, the cold, which has moved in an inward direction from the ground and passed through the outer covering 10, is blocked by the first insulation layer 110 and does not enter in the inward direction. Accordingly, the first insulation layer 110 is capable of blocking movement of the cold from the outside the sleeping bag so as to prevent unnecessary heat loss. Also, the first insulation layer 110 provided as the aluminum film material performs a heat-retaining function. In detail, the first insulation layer 110 reflects radiant heat generated from the user's body located inside the sleeping bag and prevents the radiant heat from moving out of the sleeping bag. Accordingly, it is possible to derive a greater heat-retaining effect using the first insulation layer 110. Additionally, the first insulation layer 110 provided as the aluminum film material performs a water-repelling function. Accordingly, since humidity formed from the ground is blocked by the first insulation layer 110 and does not move into the sleeping bag while moving into the sleeping bag, the user may be prevented from becoming wet due to the humidity. Also, the first insulation layer 110 additionally has a water-permeating function. Accordingly, since humidity such as sweat and the like generated from the user's body may be absorbed, the user may feel pleasant inside the sleeping bag. The above water-repelling function and water-permeating function of the first insulation layer will be equally applied to a second insulation layer 150 which will be described below.

The first compressed fiber layer 120 is a component configured to minimize an inflow of the cold outside the sleeping bag. To this end, the first compressed fiber layer 120 is located on one surface which faces an inward direction of the first insulation layer 110. Also, the first compressed fiber layer 120 includes a pressure padding material. In detail, the first compressed fiber layer 120 includes a polyester fiber material. In more detail, the first compressed fiber layer 120 includes one or more layers having the polyester fiber material. An air layer formed in the first compressed fiber layer 120 having the above single-layer structure or multi layer structure performs a function of interfering with an airflow which is discharged outward from the sleeping bag or permeates the sleeping bag so as to minimize a heat loss. Accordingly, a greater heat-retaining effect may be obtained in comparison to a case excluding the first compressed fiber layer 120. As a more preferable embodiment, the first compressed fiber layer 120 may further include an additional heat-retraining member 231 having a material such as animal fur and fiber balls. Since it is possible to minimize cold permeation by using the first compressed fiber layer 120, a heat-retaining operation may be more easily performed.

The heat-retention layer 130 is a component configured to generate heat inside the sleeping bag. To this end, the heat-retention layer 130 is located on one surface which faces the inside of the first compressed fiber layer 120. Also, the heat-retention layer 130 generates heat using heat of adsorption and heat of condensation. In detail, the heat-retention layer 130 is provided as a water-absorption and heat-generation layer having an acrylate-based fiber material. In more detail, when the heat-retention layer 130 comes into contact with steam such as sweat and the like discharged from the user inside the sleeping bag and the steam is coupled and fixed to acrylate-based fiber, heat is exchanged and the steam changes to a liquid so that heat of adsorption and heat of condensation are generated. Accordingly, heat may be generated inside the sleeping bag so as to increase a temperature inside the sleeping bag. In addition, the heat-retention layer 130 provided as a water-absorption and heat-generation layer may also generate heat with respect to steam which permeates the sleeping bag from the outside thereof using heat of adsorption and heat of condensation. Accordingly, since heat may be generated using humidity even at a time when a large amount of humidity is generated from the ground such as at dawn, it is possible to prevent sleep and rest of the user from being interfered with due to humidity inside the sleeping bag and to allow the user to enjoy an effect of more easily increasing a temperature inside the sleeping bag. As a more preferable embodiment, the heat-retention layer 130 provided as the heat-adsorption heat-generation layer may include a fiber material having a hydrophilic group such as an amino group, a carboxyl group, a hydroxyl group, and the like so as to have greater efficiency in forming heat of adsorption.

Figure 4:
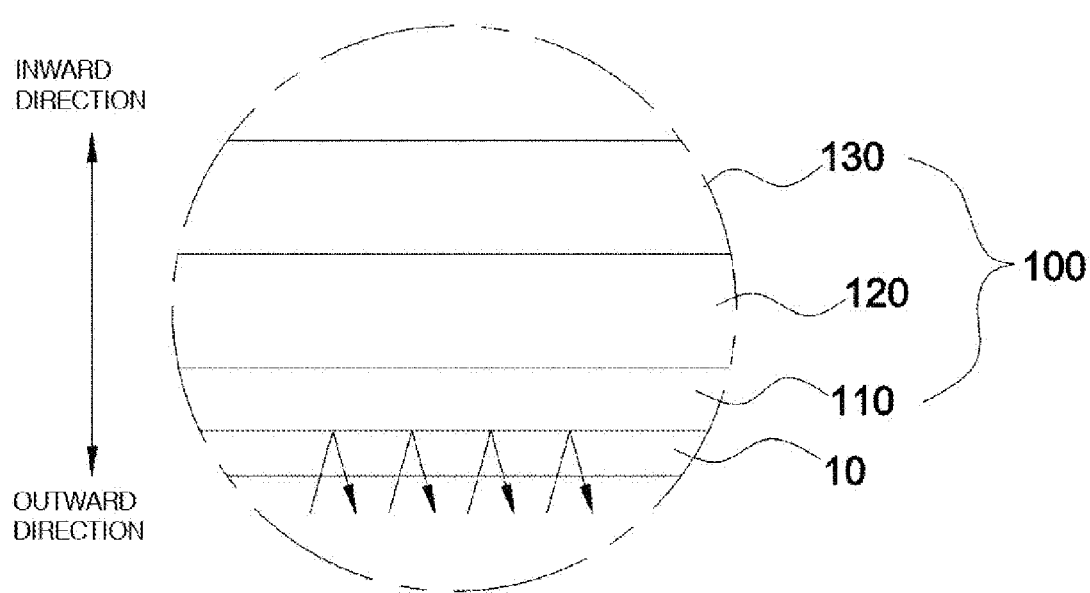
FIG. 4 is a cross-sectional view in which the cold outside the sleeping bag is prevented from flowing into the sleeping bag by a first insulation layer according to one embodiment of the present invention.

Referring to FIG. 4, the cold, which moves from the outside of the sleeping bag outer covering 10 to the inside of the sleeping bag, is blocked by the first insulation layer 110, which is an aluminum film, so as to be restricted in movement in the inward direction. Also, the cold, which passes through the first insulation layer 110 and moves into the sleeping bag, is interfered with in regard to movement by the first compressed fiber layer 120 formed of a multilayer fiber material so as to suppress heat conduction and heat convection. Accordingly, since occurrence of heat loss inside the sleeping bag may be minimized, a temperature of the internal space of the sleeping bag may be easily maintained. Also, since warmth inside the sleeping bag does not move from the internal space of the sleeping bag to the outside thereof and may be convected and circulated, a heat-retaining property may be increased.

Figure 5:
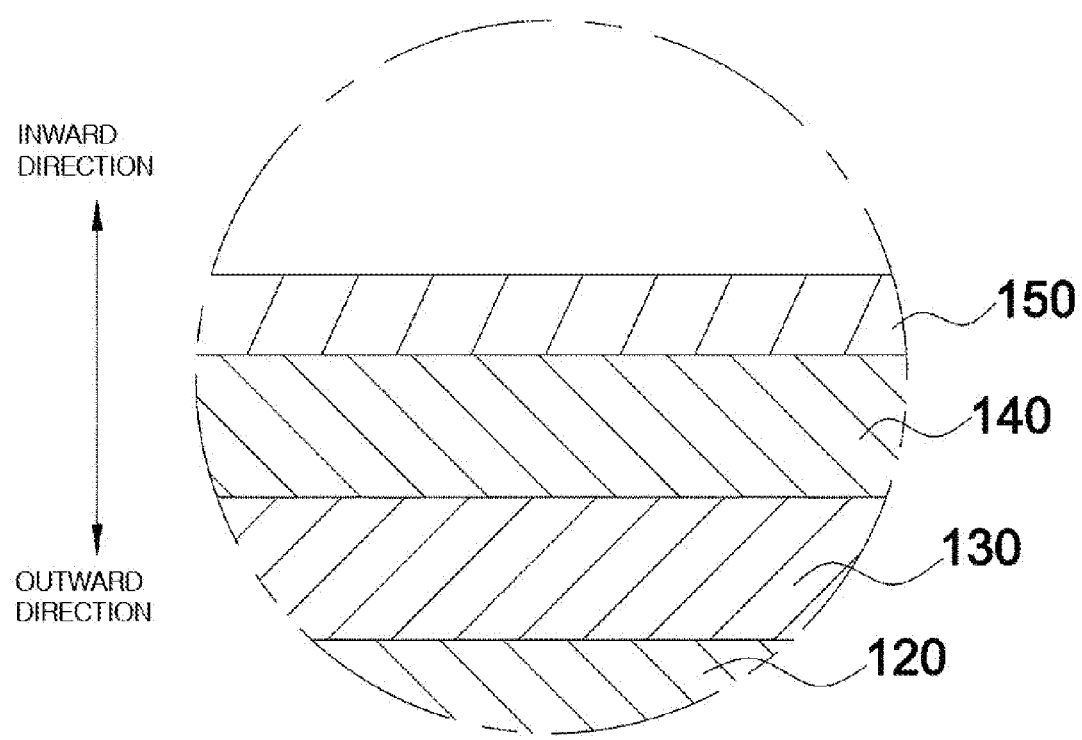
FIG. 5 is a view illustrating a second insulation layer and a second compressed fiber layer according to one embodiment of the present invention.
Figure 6:
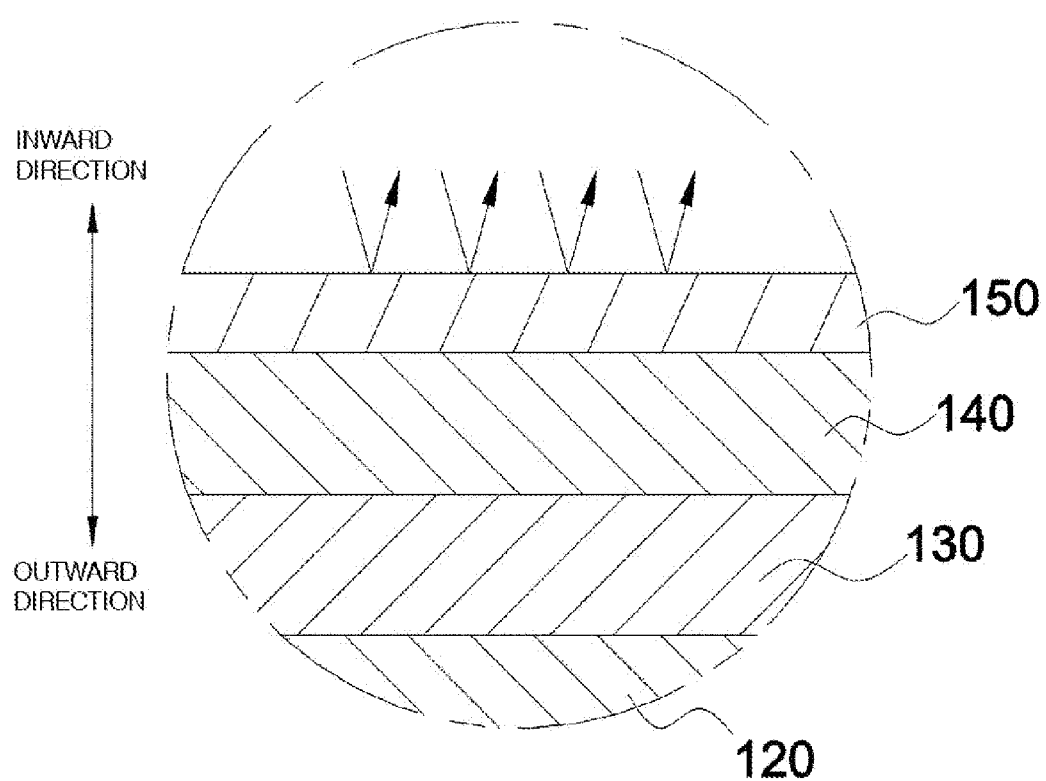
FIG. 6 is a cross-sectional view in which warmth inside the sleeping bag is prevented from being released to the outside by the second insulation layer according to one embodiment of the present invention.

FIG. 5 is a view illustrating the second insulation layer and the second compressed fiber layer according to one embodiment of the present invention, and FIG. 6 is a cross-sectional view in which warmth inside the sleeping bag is prevented from being released to the outside by the second insulation layer according to one embodiment of the present invention.

The second compressed fiber layer 140 and the second insulation layer 150 perform the same functions as those of the above first compressed fiber layer 120 and the first insulation layer 110. In detail, the second compressed fiber layer 140 increases an insulation property and a heat-retaining property by preventing convection of air like the first compressed fiber layer 120, and the second insulation layer 150 reflects heat like the first insulation layer 110.

The second compressed fiber layer 140 interferes in movement of warmth located inside the sleeping bag toward the outside. To this end, the second compressed fiber layer 140 is located on one surface toward the inside of the heat-retention layer 130 and includes a polyester fiber material. An air layer located inside the second compressed fiber layer 140 interferes in the movement of the warmth inside the sleeping bag toward the outside. Accordingly, a release of the warmth inside the sleeping bag may be minimized so as to maximize the insulation property and the heat-retaining property. Also, the second compressed fiber layer 140 may include one or more layers having the same polyester fiber material as the structure of the first compressed fiber layer 120 so as to have a greater heat-retaining effect.

The second insulation layer 150 is a component configured to prevent warmth from being released. In detail, the second insulation layer 150 blocks the movement of the warmth inside the sleeping bag toward the outside. To this end, the second insulation layer 150 is located on one surface which faces the inside of the second compressed fiber layer 140. Also, the second insulation layer 150 includes an aluminum film material. Accordingly, the warmth generated from the user's body and located inside the sleeping bag meets and is reflected by the second insulation layer 150 having an aluminum film material and does not move toward the outside of the sleeping bag (refer to FIG. 6). Accordingly, more significant insulation and heat-retaining effects may be provided though the second insulation layer 150 which performs a function of preventing warmth from being released in addition to the first insulation layer 120 which prevents an inflow of the cold.

Since it is possible to effectively prevent the warmth of the sleeping bag from being released, to effectively prevent the inflow of the cold, and to increase and maintain a temperature inside the sleeping bag on the basis of steam generated from the user's body or the ground using the series of components described above with reference to FIGS. 3 to 6, the insulation property and the heat-retaining property may be significantly increased. Meanwhile, the warmth-improving portion 100 may be formed on the part of the sleeping bag at which the weight of the user is applied to the ground and additionally provided on a part corresponding to a chest part of the user located inside the sleeping bag.

Figure 7:
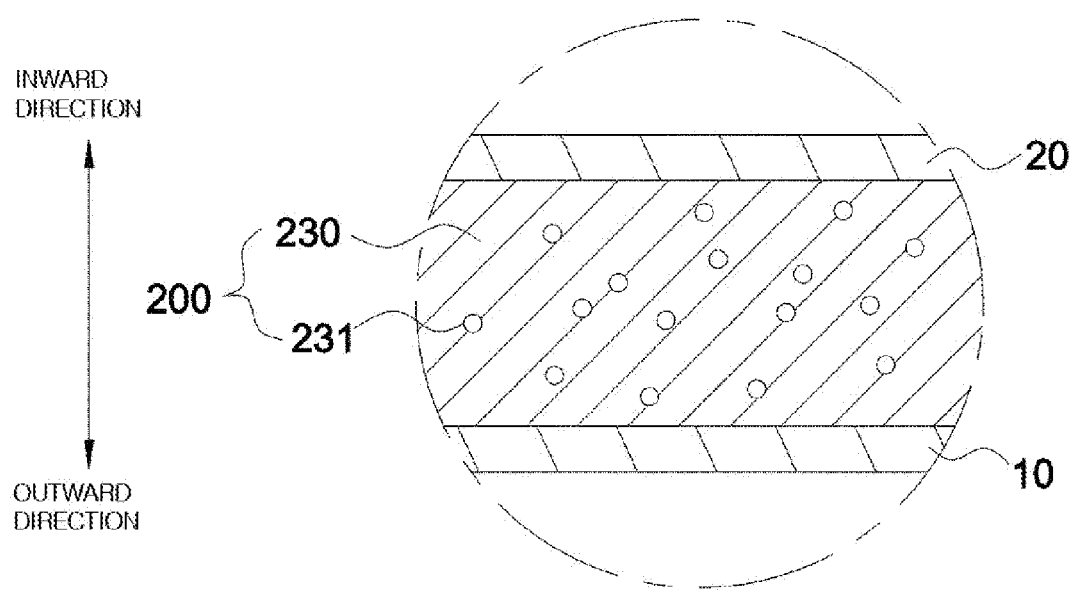
FIGS. 7, 8 and 9 are cross-sectional views illustrating a filler member according to another embodiment of the present invention.
Figure 8:
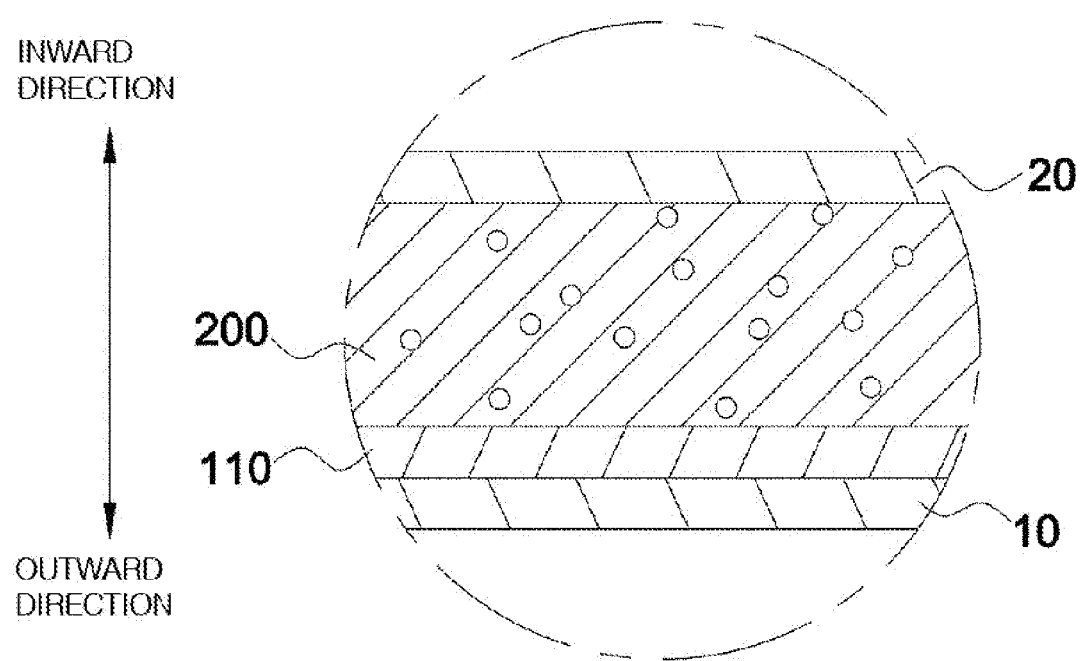
Figure 9:
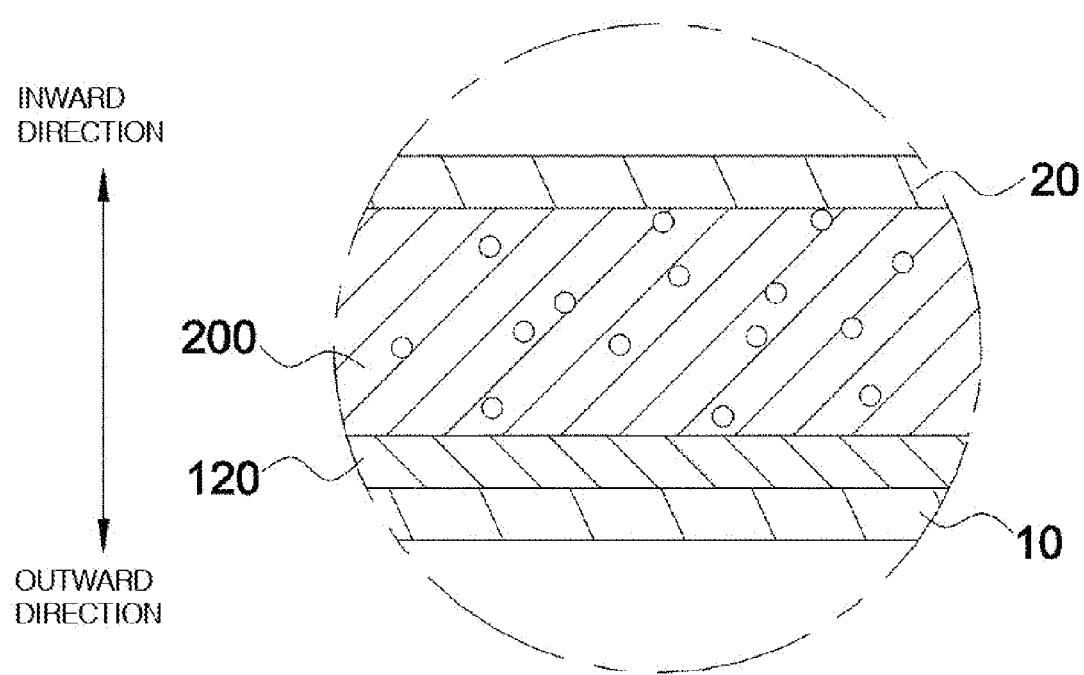

FIGS. 7 to 9 are cross-sectional views illustrating a filler member 200 according to another embodiment of the present invention.

FIGS. 7 to 9 illustrate the filler member 200 formed on at least one part of the sleeping bag. In detail, the above-described "at least one part of the sleeping bag" means a part of the sleeping bag which is located above the part of the sleeping bag, which comes into contact with the ground, and refers to a part which comes into contact with the face and the chest part located on a front surface of the body when the user enters and lies down in the sleeping bag. That is, when the sleeping bag according to the present invention is disposed on the ground, the filler member 200 is located above the warmth-improving portion 100 according to one embodiment of the present invention. However, the above "at least one part of the sleeping bag" is not limited thereto and may refer to a region excluding the backrest part of the sleeping bag.

The filler member 200 according to another embodiment of the present invention is a component configured to maximize a heat-retaining property and an insulation property by preventing the cold outside the sleeping bag from being convected in an inward direction and inducing the warmth to be convected inside the sleeping bag like the heat-retention portion 130 according to one embodiment. To this end, the filler member 200 according to another embodiment of the present invention is filled and located between the sleeping bag outer covering 10 and the sleeping bag inner covering 20, has a ball padding material, and includes the heat-retaining member 231. A plurality of such heat-retaining members 231 are provided in a heat-retaining portion 230 and are components configured to suppress heat convection and includes natural materials such as duck down, goose down, and the like, fiber balls, or the like. Particularly, fiber balls are a component configured to perform a function of interfering in air flow without using animal feathers so as to be eco-friendly which does not require breeding and slaughtering animals so as to use natural materials such as duck down, goose down, and the like. Since it is possible to easily block the cold, which permeates into the sleeping bag from every direction in addition to from the ground, using the above filler member 200, heat-retaining efficiency may be maximized.

Referring to FIGS. 8 and 9, in another embodiment of the present invention, the first insulation layer 110 and the first compressed fiber layer 120 which have been described above with reference to FIGS. 3 and 4 may be further included. In detail, the first insulation layer 110 and the first compressed fiber layer 120 are provided on one surface which faces the inside of the sleeping bag outer covering 10 while being located between the sleeping bag outer covering 10 and the filler member 200. Accordingly, since it is possible to easily block an inflow of the cold outside the sleeping bag even on parts of the sleeping bag in addition to the backrest part of the sleeping bag, the heat-retaining property and the insulation property may be maximized.

As another embodiment of the present invention, when both the first insulation layer 110 and the first compressed fiber layer 120 are provided between the sleeping bag outer covering 10 and the filler member 200, the first insulation layer 110 is provided on one surface which faces the inside of the sleeping bag outer covering 10 and the first compressed fiber layer 120 is located between the first insulation layer 110 and the filler member 200. That is, when both the first insulation layer 110 and the first compressed fiber layer 120 are provided, they may be located in the same manner as an arrangement structure of the first insulation layer 110 and the first compressed fiber layer 120 which have been described above with reference to FIG. 3. In addition, as described above, the second compressed fiber layer 140 and the second insulation layer 150 of FIG. 6 are further provided. Here, the second compressed fiber layer 140 may be located on one surface which faces the inside of the filler member 200 and the second insulation layer 150 may be provided between the filler member 200 and the second compressed fiber layer 140. Accordingly, since it is possible to prevent warmth from being released even on parts of the sleeping bag in addition to the backrest part of the sleeping back, heat-retaining efficiency may be significantly increased.

Figure 10:
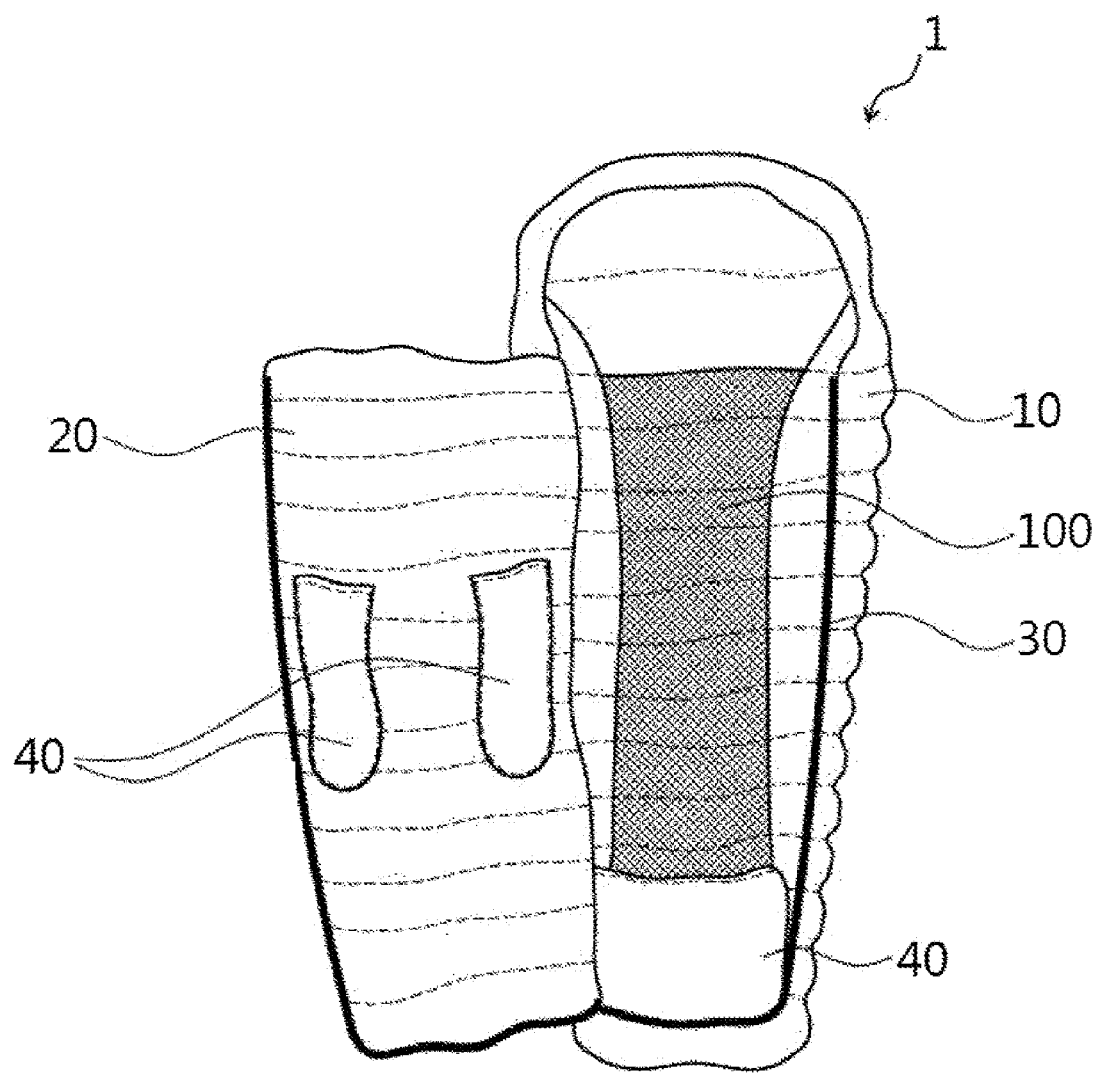
FIGS. 10, 11 and 12 are views illustrating a heat-generation bag portion according to one embodiment of the present invention.
Figure 11:
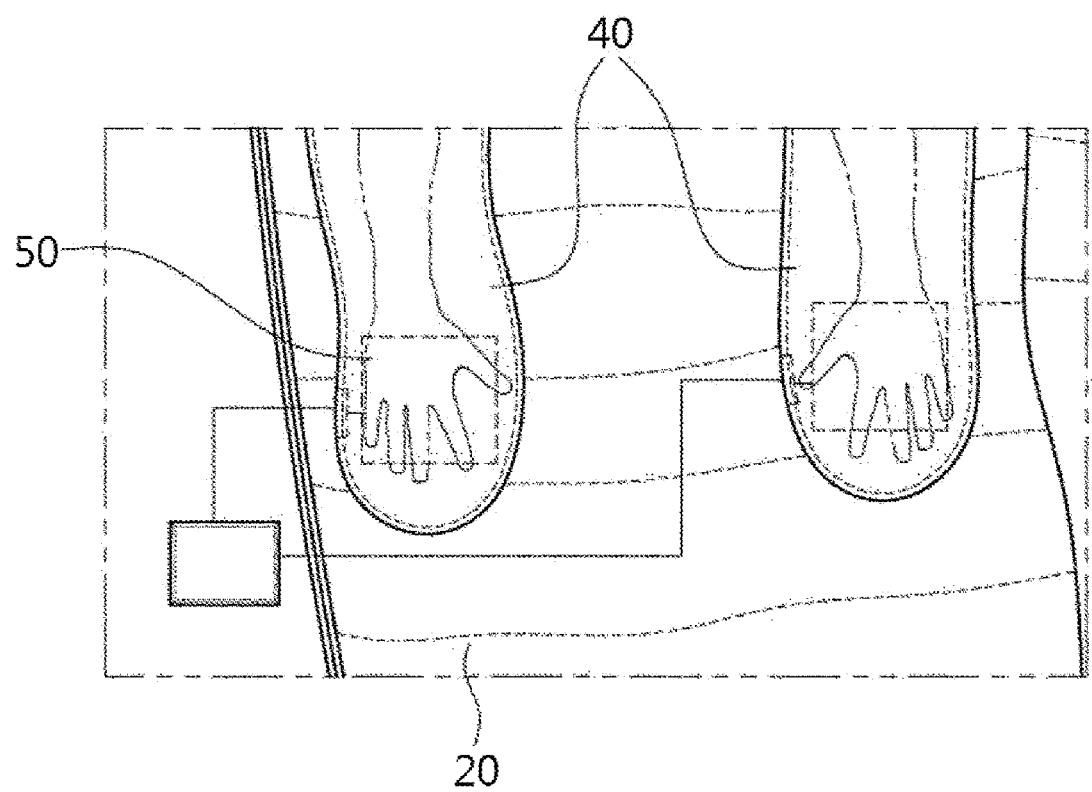
Figure 12:
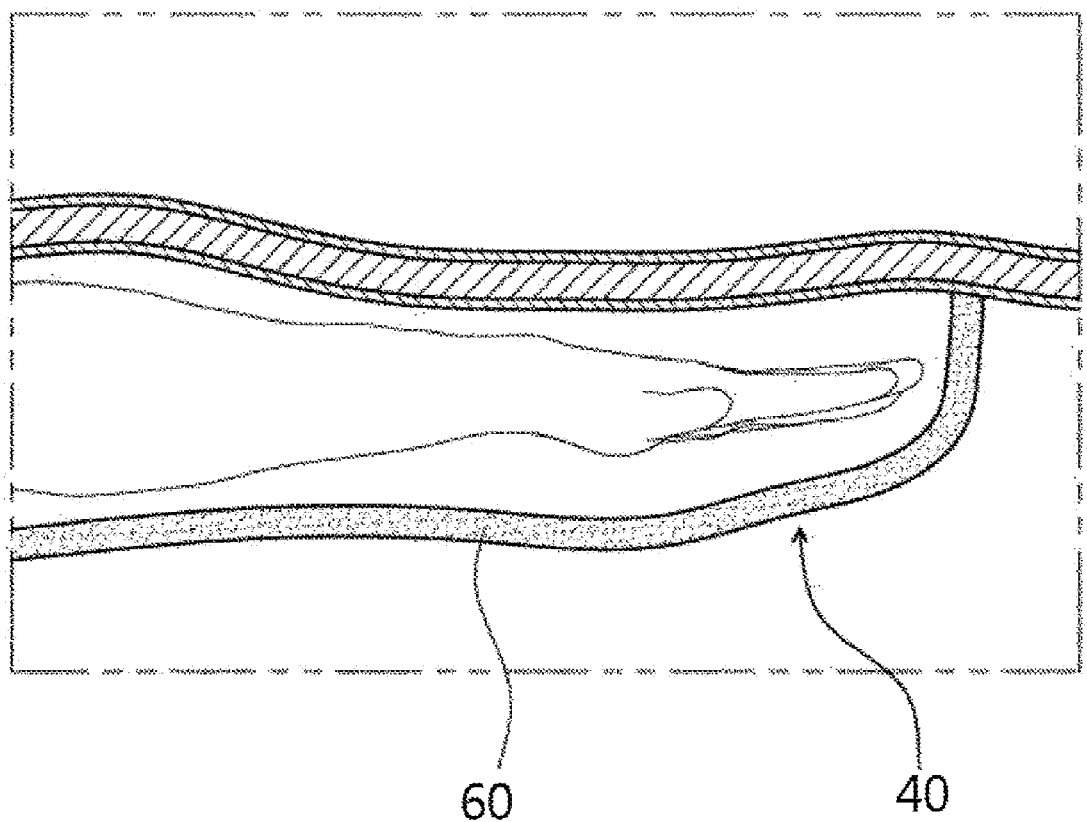

FIGS. 10 to 12 are views illustrating a heat-generation bag portion 40 according to one embodiment of the present invention.

The heat-generation bag portion 40 is provided inside the sleeping bag outer covering 10. The heat-generation bag portion 40 is configured to allow a part of the body, and particularly, a distal end such as a hand, foot, or the like of the user to be inserted therein, and a separate heat-generation device may be further provided in the heat-generation bag portion 40. Also, the heat-generation device provided in the heat-generation bag portion 40 may include a hot wire such as an electrical line and the like so as to generate heat by receiving power.

A heat-generation member 50 may be electrically connected to a separate external charger such as a portable battery and the like to be charged and supply electricity to the heat-generation device provided in the heat-generation bag portion 40 so as to retain heat of the body by increasing a temperature inside the heat-generation bag portion 40.

Memory foam 60 is a kind of sponge that has high density and low elasticity so as to have a strong shock absorption effect and water repellency performance as well as water permeation performance so as to minimize a body temperature change caused by humidity generated from a human body. Accordingly, since the heat-generation bag portion 40 is partially filled with the memory foam 60, an effect of retaining heat of hands and feet which are vulnerable to a temperature change may be increased.

Since the user may easily retain heat at distal end parts of the body such as hands, feet, and the like which are vulnerable to the cold using the above series of components, it is possible to sleep and rest more comfortably inside the sleeping bag. Also, since multiple insulation effects and multiple heat-retaining effects may be provided using the series of components described above with reference to FIGS. 3 to 9, even when a separate heat-generation device such as a heater and the like is not carried, it is possible to easily retain heat only using the sleeping bag. Accordingly, the user who performs outdoor activities such as a variety of recreation activities and the like does not need to inconveniently carry the separate heat-generation device, and thus convenience may be maximized. Also, in the present invention, since heat is generated using steam such as sweat and the like generated inside the sleeping bag, the user may sleep and rest in more pleasant environments.

The exemplary embodiments of the present invention have been described as examples, and it is apparent that a variety of modifications, changes, and additions may be made by one of ordinary skill in the art without departing from the concept and range of the present invention and the modifications, changes, and additions are included in the scope of the following claims.

Since a variety of substitutions, modifications, and changes of the present invention may be made by one of ordinary skill in the art without departing from the technical scope of the present invention, the present invention is not limited to the above-described embodiments and the attached drawings.

INDUSTRIAL APPLICABILITY

According to the present invention, since it is possible to block the cold from the outside and to prevent warmth inside from being released using a first insulation layer, heat-retaining performance may be maximized.

Also, according to the present invention, since heat is generated on the basis of steam outside and inside a sleeping bag using a heat-retention layer, it is possible to easily increase and maintain a temperature inside the sleeping bag without a separate heat source.

Also, according to the present invention, heat-retaining efficiency may be significantly increased by interfering in convection of the cold outside the sleeping bag in an inward direction using a first compressed fiber layer.

What is claimed is:

1. A sleeping bag comprising:
   a sleeping bag outer covering defining an internal space configured to accommodate a user;
   a plurality of heat-generation bag portions disposed inside the sleeping bag outer covering, each heat-generation bag portion including opposing ends, one of the ends of said each heat-generation bag portion defining an opening within the internal space defined by the sleeping bag outer covering and configured to receive a body part of the user inside the sleeping bag;
   a plurality of heat-generation members connected to the heat-generation bag portions and configured to increase a temperature of the heat-generation bag portions;
   a first warmth-improving portion disposed inside the sleeping bag outer covering, the first warmth-improving portion comprising:
      a first insulation layer located on one surface in an inward direction of the sleeping bag outer covering;
      a first compressed fiber layer located on one surface of the first insulation layer;
      a heat-retention layer located on one surface of the first compressed fiber layer;
      a second compressed fiber layer having a polyester fiber material located on one surface of the heat-retention layer, the heat-retention layer located between the first compressed fiber layer and the second compressed fiber layer; and
      a second insulation layer having an aluminum film material located on one surface of the second compressed fiber layer; and
   a second warmth-improving portion disposed inside the sleeping bag outer covering and separate from the first warmth-improving portion, the second warmth-improving portion comprising:
      a filler member including a heat-retaining portion and a plurality of heat-retaining members provided in the heat-retaining portion; and
      at least one of a third insulation layer and a third compressed fiber layer located on another surface in the inward direction of the sleeping bag outer covering and on one surface of the filler member,
   wherein the first insulation layer is an aluminum film,
   wherein an inflow of cold air outside the sleeping bag is blocked by the first insulation layer,
   wherein warmth inside the sleeping bag is prevented, by the second insulation layer, from being released outward,
   wherein a convection current of air inside the sleeping bag is prevented by the first compressed fiber layer and the second compressed fiber layer, and
   wherein the first warmth-improving portion is formed at a back part to which a weight of a user is applied toward the ground and a side part so as to prevent heat-retaining and insulating effects from being decreased by the weight of the user.

2. The sleeping bag of claim 1, wherein the first compressed fiber layer comprises a polyester fiber material.

3. The sleeping bag of claim 1, wherein the heat-retention layer is a water-absorption and heat-generation layer which generates heat using heat of adsorption and heat of condensation with steam.

4. The sleeping bag of claim 3, wherein the water-absorption and heat-generation layer comprises an acrylate-based material.

5. The sleeping bag of claim 1, wherein at least one of the heat-generation bag portions includes memory foam, and wherein at least one of the heat-generation members includes a wire configured to electrically connect to a charger for supplying electricity to the wire.

* * * * *